(12) United States Patent
Liu et al.

(10) Patent No.: US 10,492,168 B2
(45) Date of Patent: Nov. 26, 2019

(54) PAGING DETECTION UTILIZING A DISCOVERY REFERENCE SIGNAL (DRS) WITHIN A SUBFRAME TIME WINDOW

(71) Applicant: Telefonaktiebolaget LM Ericsson (publ), Stockholm (SE)

(72) Inventors: Jinhua Liu, Beijing (CN); Gen Li, Beijing (CN); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/517,645

(22) PCT Filed: May 3, 2016

(86) PCT No.: PCT/CN2016/080874
§ 371 (c)(1),
(2) Date: Apr. 7, 2017

(87) PCT Pub. No.: WO2017/190269
PCT Pub. Date: Nov. 9, 2017

(65) Prior Publication Data
US 2018/0199308 A1    Jul. 12, 2018

(51) Int. Cl.
*H04W 76/00* (2018.01)
*H04W 68/02* (2009.01)
*H04L 5/00* (2006.01)
*H04W 52/02* (2009.01)
(Continued)

(52) U.S. Cl.
CPC .......... *H04W 68/02* (2013.01); *H04L 5/0048* (2013.01); *H04L 5/0078* (2013.01); *H04W 52/0216* (2013.01); *H04W 52/0274* (2013.01); *H04W 72/1205* (2013.01); *H04L 5/001* (2013.01); *H04W 76/28* (2018.02); *Y02D 70/00* (2018.01); *Y02D 70/1262* (2018.01); *Y02D 70/20* (2018.01);
(Continued)

(58) Field of Classification Search
CPC ............ H04W 68/02; H04W 52/0216; H04W 52/0274; H04W 72/1205; H04W 76/28; H04L 5/0048; H04L 5/0078; H04L 5/001
See application file for complete search history.

(56) References Cited

U.S. PATENT DOCUMENTS

2015/0296443 A1    10/2015 Lim et al.
2017/0311316 A1*   10/2017 Chendamarai Kannan ................
                                                          H04L 5/0048

FOREIGN PATENT DOCUMENTS

| CN | 104717687 A | 6/2015 |
| CN | 104968052 A | 10/2015 |
| CN | 105338568 A | 2/2016 |

* cited by examiner

*Primary Examiner* — Pakee Fang
(74) *Attorney, Agent, or Firm* — Sage Patent Group (57) ABSTRACT

The present disclosure provides a paging method at an access node, comprising: calculating a time window for transmission of a discovery reference signal DRS, in which a paging message is allowed to be transmitted to a user equipment UE; Determining whether there is a subframe available for transmission of the DRS within the time window; and if it is determined that there is a subframe available for transmission of the DRS within the time window, transmitting (S105) the paging message in the same subframe to the UE. The present disclosure also provides an access node using the paging method, a paging detection method at a UE, and a UE using the paging detection method.

15 Claims, 6 Drawing Sheets

(51) Int. Cl.
*H04W 72/12* (2009.01)
*H04W 76/28* (2018.01)
(52) U.S. Cl.
CPC .............. *Y02D 70/24* (2018.01); *Y02D 70/25* (2018.01); *Y02D 70/26* (2018.01)

PAGING DETECTION UTILIZING A DISCOVERY REFERENCE SIGNAL (DRS) WITHIN A SUBFRAME TIME WINDOW

TECHNICAL FIELD

The present disclosure generally relates to the technical field of telecommunication, and particularly to a paging method, a paging detection method, an access node using the paging method, and a user equipment (UE) using the paging detection method.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

For the time being, Licensed Assisted Access Long-Term Evolution (LAA-LTE) and LTE over Unlicensed carrier in Stand Alone mode (LTE-USA) are under discussion.

Figure 1:
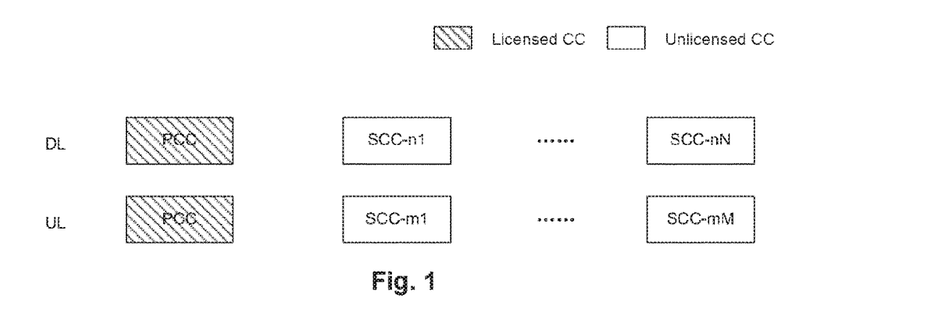
FIG. 1 illustratively shows an example of CA of LAA-LTE.

For LAA LTE, a network shall be operated in a carrier aggregation (CA) mode, a primary component carrier (CC) shall be a licensed CC, and control functionality is mainly via the primary CC (PCC). The unlicensed CC can only be the secondary CCs (SCCs). Configuration and activation/de-activation of the unlicensed CC follow a typical procedure for CA. Network discovery and mobility management are based on measurements based on the PCC. FIG. 1 illustratively shows an example of CA of LAA-LTE. As shown in FIG. 1, there is one licensed CC in a downlink (DL) and one licensed CC in an uplink (UL) as the PCC for DL and the PCC for UL, respectively (of course, more than one licensed CC in DL and more than one licensed CC in UL as the PCC for DL and the PCC for UL respectively are possible); meanwhile, there are multiple unlicensed CCs either in DL or UL or in both DL and UL.

Figure 2:
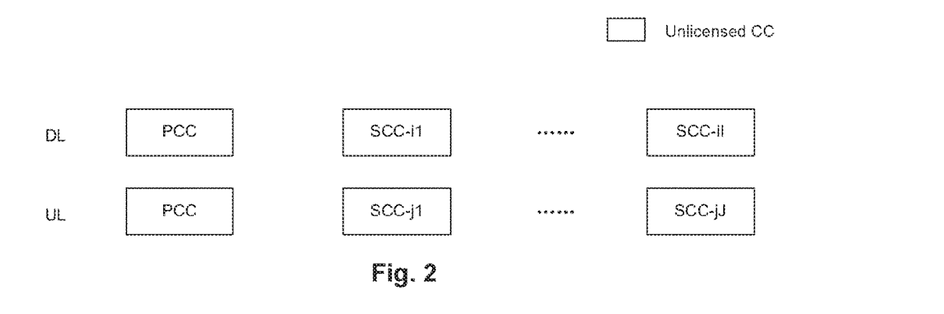
FIG. 2 illustratively shows an example of CA of LTE-USA.

For LTE-USA, there is no licensed CC to be used as a PCC. That is, the control functionalities that are managed based on the licensed CC in LAA-LTE shall be realized via unlicensed CCs in LTE-USA. Due to channel availability of the unlicensed CC is opportunistic, control signals and related procedures shall be modified in relation to restriction of channel availability. FIG. 2 illustratively shows an example of CA of LTE-USA. As shown in FIG. 2, there is one unlicensed CC in DL and one unlicensed CC in UL as the PCC for DL and the PCC for UL, respectively (of course, more than one unlicensed CC in DL and more than one unlicensed CC in UL as the PCC for DL and the PCC for UL respectively are possible); meanwhile, there are multiple unlicensed CCs either in DL or UL or in both DL and UL.

Figure 3:
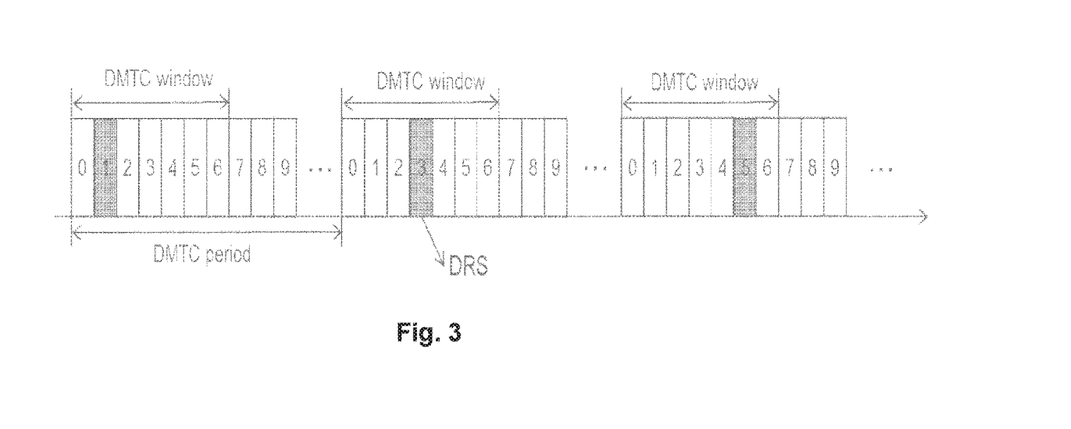
FIG. 3 illustratively shows a DRS monitoring in LTE-USA.

One issue of LTE-USA is that some basic reference signals (referred to as Discovery Reference Signals, DRS) used for network discovery shall be adaptively transmitted based on carrier sensing results, instead of transmitting at predefined time. The DRS may comprise Primary Synchronization Signal (PSS), Secondary Synchronization Signal (SSS), Cell-specific Reference Signal (CRS), Channel State Information-Reference Signal (CSI-RS), etc. The DRS is further allowed to move within a DRS Measurement Time Configuration (DMTC) window. In such condition, a UE shall monitor the DRS by tentatively demodulating the DRS in multiple possible places within the DMTC window until the DRS is identified. A typical DMTC window size is 6 subframes while a DMTC period may be 40 or 80 ms. FIG. 3 illustratively shows a DRS monitoring in LTE-USA.

Another issue of LTE-USA is that the DRS will not be transmitted as frequently as licensed CC, since the unlicensed CC shall be shared between coexisting networks and a frequent transmission of DRS will dramatically reduce resource efficiency. Besides, MIB (Master Information Block) system information will be transmitted along with DRS transmission for LTE-USA.

To receive paging messages from a radio access network, e.g. E-UTRAN, UEs in idle mode monitor a Physical Downlink Control Channel (PDCCH) for a Radio Network Temporary Identity (RNTI) value used to indicate paging, i.e., Paging-RNTI (P-RNTI). The UE only needs to monitor the PDCCH channel at certain UE-specific occasions. At other times, the UE may apply Discontinuous Reception (DRX), meaning that the UE can switch off its receiver to preserve battery power. The E-UTRAN configures which of radio frames and subframes are used for paging. Each cell broadcasts a default paging cycle, which is also referred to as a cell-specific default paging cycle. In addition, upper layers may use a dedicated signaling to configure a UE-specific paging cycle. If both of the cell-specific default paging cycle and the UE-specific paging cycle are configured, the UE applies the lowest value as a paging cycle of the UE. The UE calculates the radio frame (i.e., the Paging Frame (PF)) and the subframe within that PF (i.e., the Paging Occasion (PO)) which E-UTRAN applies to page the UE according to Formula (1) as follows:

$$\text{SFN (i.e., System Frame Number) mod } T = (T/N) \times (\text{UE\_ID mod } N) \quad (1)$$

i_s=⌊UE_ID/N⌋ mod Ns
T=UE DRX cycle (i.e., paging cycle)=min(Tc, Tue)
N=min(T, nB)
Ns=max(1, nB/T)

where:
  Tc is a cell-specific default paging cycle {32, 64, 128, 256} radio frames;
  Tue is a UE-specific paging cycle {32, 64, 128, 256} radio frames;
  N is the number of paging frames within a paging cycle T of the UE;
  UE_ID is International Mobile Subscriber ID (IMSI) mod 1024, with IMSI being a decimal rather than a binary number;
  i_s is an index pointing to a pre-defined table defining a corresponding subframe,
  nB is the number of 'paging subframes' per paging cycle (across all UEs in the cell),
  Ns is the number of 'paging subframes' in a radio frame that is used for paging.

Table 1 below lists a number of examples to illustrate calculation of the paging radio frames (i.e., PF) and subframes (i.e., PO).

TABLE 1

| Case | UE_ID | $T_c$ | $T_{ue}$ | T | nB | N | Ns | PF | i_s | PO |
|---|---|---|---|---|---|---|---|---|---|---|
| A | 147 | 256 | 256 | 256 | 64 | 64 | 1 | 76 | 0 | 9 |
| B | 147 | 256 | 128 | 128 | 32 | 32 | 1 | 76 | 0 | 9 |
| C | 147 | 256 | 128 | 128 | 256 | 128 | 2 | 19 | 1 | 4 |

Figure 4:
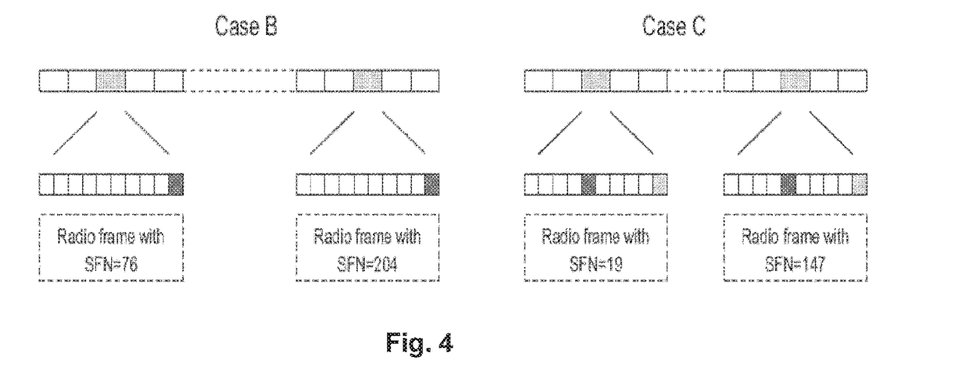
FIG. 4 illustrates some examples of PF and PO in the prior art.

In cases A and B in Table 1, one out of every four radio frames is used for paging, using one subframe in each of those radio frames. For case B, there are 32 paging frames within the paging cycle of the UE, across which the UEs are distributed based on the UE_ID. In case C, two subframes in each radio frame are used for paging, i.e. Ns=2. In this case, there are 128 paging frames within the paging cycle of the UE and the UEs are also distributed across the two subframes within the paging frame. The LTE specifications include a table that indicates the subframe applicable for each combination of Ns and i_s, which is the index that follows from Formula (1). FIG. 4 illustrates cases B and C of PF and PO. All the shaded subframes can be used for paging; and the darker ones are applicable for the UE with the indicated identity.

In traditional LTE systems operating in a licensed band, i.e., LAA-LTE, idle UEs configured with DRX will wake up in every paging cycle. A main purpose is to see if there is paging message for the UE itself. If there is no paging message for the UE itself, a time/frequency synchronization tracking is performed with DRS (e.g. including CRS) transmission in each DL subframe. However, in standalone LTE in an unlicensed band, i.e., LTE-USA, there will be no always DRS transmission for time/frequency synchronization tracking, if paging transmission fails based on a carrier sensing scheme such as Listening Before Talk (LBT) or there is no paging message. In this case, UEs couldn't make synchronization tracking to adjust e.g. a clock drift in LTE-USA, if the paging message is transmitted using the same mechanism as in LAA-LTE.

Hence, there may be some disadvantages in terms of power consumption and channel availability if conventional paging methods are used for LTE-USA. In particular, there may be some aspects of disadvantages as described below with conventional paging methods being used for LTE-USA:

As a first aspect, a UE has to monitor both a DRS and a paging message individually if the DRS and the paging messages are sent via separate time windows. The power consumption at the UE side can increase largely.

As a second aspect, channel utility may be wasteful just for the paging message transmission. The paging message transmission will block a neighboring node to use the channel. If there are multiple neighboring nodes, generated load of paging messages could be considerable.

Therefore, paging related technical solutions are desired which can solve at least the above problems.

SUMMARY

An object of the present disclosure is to provide a mechanism for paging by aligning paging message transmission and DRS transmission. In the mechanism disclosed, channel availability and UE power consumption for paging message detection are considered, so that the power consumption at the UE side may be saved, and channel utility can be raised.

According to one aspect of the present disclosure, a paging method at an access node is provided. The paging method comprises: calculating a time window for transmission of a discovery reference signal DRS, in which a paging message is allowed to be transmitted to a user equipment UE; determining whether there is a subframe available for transmission of the DRS within the time window; and if it is determined that there is a subframe available for transmission of the DRS within the time window, transmitting the paging message in the same subframe to the UE.

In an embodiment of the paging method, the time window is calculated according to one of:
an identifier of the UE 'UE_ID' and a cell-specific paging cycle for the UE;
the UE_ID, the cell-specific paging cycle for the UE and a UE-specific paging cycle for the UE;
the UE_ID, the cell-specific paging cycle for the UE and a number of the time windows in one paging cycle for the UE.

In an embodiment of the paging method, the paging method further comprises: if it is determined that there is no subframe available for transmission of the DRS within the time window, selecting a subsequent time window for transmission of the DRS, in which the paging message is allowed to be transmitted to the UE.

According to another aspect of the present disclosure, an access node is provided. The access node comprises: a transceiver; a calculation unit configured to calculate a time window for transmission of a discovery reference signal DRS, in which a paging message is allowed to be transmitted to a user equipment UE; and a determination unit configured to determine whether there is a subframe available for transmission of the DRS within the time window, wherein if the determination unit determines that there is a subframe available for transmission of the DRS within the time window, the transceiver is configured to transmit the paging message in the same subframe to the UE.

In an embodiment of the access node, the time window is calculated according to one of:
an identifier of the UE 'UE_ID' and a cell-specific paging cycle for the UE;
the UE_ID, the cell-specific paging cycle for the UE and a UE-specific paging cycle for the UE;
the UE_ID, the cell-specific paging cycle for the UE and a number of the time windows in one paging cycle for the UE.

In an embodiment of the access node, the access node further comprises:
a selection unit configured to, if the determination unit determines that there is no subframe available for transmission of the DRS within the time window, select a subsequent time window for transmission of the DRS, in which the paging message is allowed to be transmitted to the UE.

In an embodiment of the access node, the access node is an eNodeB.

According to another aspect of the present disclosure, a paging detection method at a user equipment UE is provided. The paging detection method comprises: calculating a time window for detecting a discovery reference signal DRS, in which a paging message is to be monitored; determining whether there is a DRS detected in a subframe within the time window; and if it is determined that there is a DRS detected in a subframe within the time window, detecting a paging message in the same subframe.

In an embodiment of the paging detection method, the time window is calculated according to one of:
an identifier of the UE 'UE_ID' and a cell-specific paging cycle for the UE;
the UE_ID, the cell-specific paging cycle for the UE and a UE-specific paging cycle for the UE;
the UE_ID, the cell-specific paging cycle for the UE and a number of the time windows in one paging cycle for the UE.

In an embodiment of the paging detection method, the paging detection method further comprises:

if it is determined that there is no DRS detected in any of subframes within the time window, monitoring a subsequent time window for detecting the DRS, in which a paging message is to be monitored.

In an embodiment of the paging detection method, the paging detection method further comprises:

if it is determined that there is no DRS detected in the subframe, monitoring a next subframe within the time window for detecting the DRS, in which a paging message is to be monitored, unless the subframe is the last subframe within the time window.

According to one aspect of the present disclosure, a user equipment UE is provided.

The UE comprises: a calculation unit configured to calculate a time window for detecting a discovery reference signal DRS, in which a paging message is to be monitored; a determination unit configured to determine whether there is a DRS detected in a subframe within the time window; and a detection unit configured to, if the determination unit determines that there is a DRS detected in a subframe within the time window, detect a paging message in the same subframe.

In an embodiment of the UE, the time window is calculated according to one of:

an identifier of the UE 'UE_ID' and a cell-specific paging cycle for the UE;

the UE_ID, the cell-specific paging cycle for the UE and a UE-specific paging cycle for the UE;

the UE_ID, the cell-specific paging cycle for the UE and a number of the time windows in one paging cycle for the UE.

In an embodiment of the UE, the UE further comprises: a monitoring unit configured to, if the determination unit determines that there is no DRS detected in any of subframes within the time window, monitor a subsequent time window for detecting the DRS, in which a paging message is monitored.

In an embodiment of the UE, the monitoring unit is further configured to:

monitor a next subframe within the time window for monitoring the DRS, in which a paging message is to be monitored unless the subframe is the last subframe within the time window, if the determination unit determines that there is no DRS detected in the subframe.

According to another aspect of the present disclosure, a computer program is provided, the computer program comprising instructions that when executed, cause one or more computing devices to perform any of the paging methods as previously described.

According to another aspect of the present disclosure, a computer program is provided, the computer program comprising instructions that when executed, cause one or more computing devices to perform any of the paging detection methods as previously described.

According to another aspect of the present disclosure, a computer program product is provided, the computer program product comprising a computer-readable medium storing instructions that when executed, cause one or more computing devices to perform any of the paging methods as previously described.

According to another aspect of the present disclosure, a computer program product is provided, the computer program product comprising a computer-readable medium storing instructions that when executed, cause one or more computing devices to perform any of the paging detection methods as previously described.

The technical solutions of the present disclosure may at least have beneficial effects as follows.

By aligning transmission of the paging message and transmission of the DRS in the same time window, radio resource fragmentation due to the paging message transmission as well as additional tentative decoding for the paging message due to channel availability uncertainties may be avoided; and the UE may perform synchronization using the DRS when it wakes up from the DRX state, which may guarantee good performance for receiving paging message.

By selecting the subsequent time window, due to unavailable channel in the current time window, for transmission of the DRS in which the paging message is allowed to be transmitted to the UE, the paging message may be transmitted after a time interval (in an order of $10^{th}$ of ms) which is much smaller than the DRX cycle (in seconds), which may reduce the delay for peer to peer session setup.

BRIEF DESCRIPTION OF THE DRAWINGS

The objects, advantages and characteristics of the present disclosure will be more apparent, according to descriptions of preferred embodiments in connection with the drawings, on which.

It should be noted that various parts in the drawings are not drawn to scale, but only for an illustrative purpose, and thus should not be understood as any limitations and constraints on the scope of the present disclosure.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

The techniques described herein may be used for various wireless communication networks such as CDMA, TDMA, FDMA, OFDMA, SC-FDMA and other networks. The terms "network" and "system" are often used interchangeably. The techniques described herein may be used for the wireless networks and radio technologies mentioned herein as well as other wireless networks and radio technologies proposed in the future. For clarity, certain aspects of the techniques are described below for LTE, and LTE terminology is used in much of the description below.

As used herein, the term "access node" refer to any of entities capable of accessing to any of wireless communication networks. By way of example and not limitation, the access node may comprise a base station (BS), a node B (NodeB or NB), an evolved NodeB (eNodeB or eNB), and so forth.

The term "UE" used herein refers to any device that can access a wireless communication network and receive services therefrom. By way of example, a UE may include, but is not limited to, a mobile phone, a cellular phone, a smart phone, a tablet, a wearable device, a personal digital assistant (PDA), and the like.

The basic principle of the present disclosure consists in that a paging message can only be transmitted in a subframe during which there is a DRS transmission. That is, the paging message may be buffered to wait for transmission until the DRS transmission occurs.

Hereinafter, a flowchart of a paging method at an access node according to an embodiment of the present disclosure will be described with reference to FIG. 5.

Figure 5:
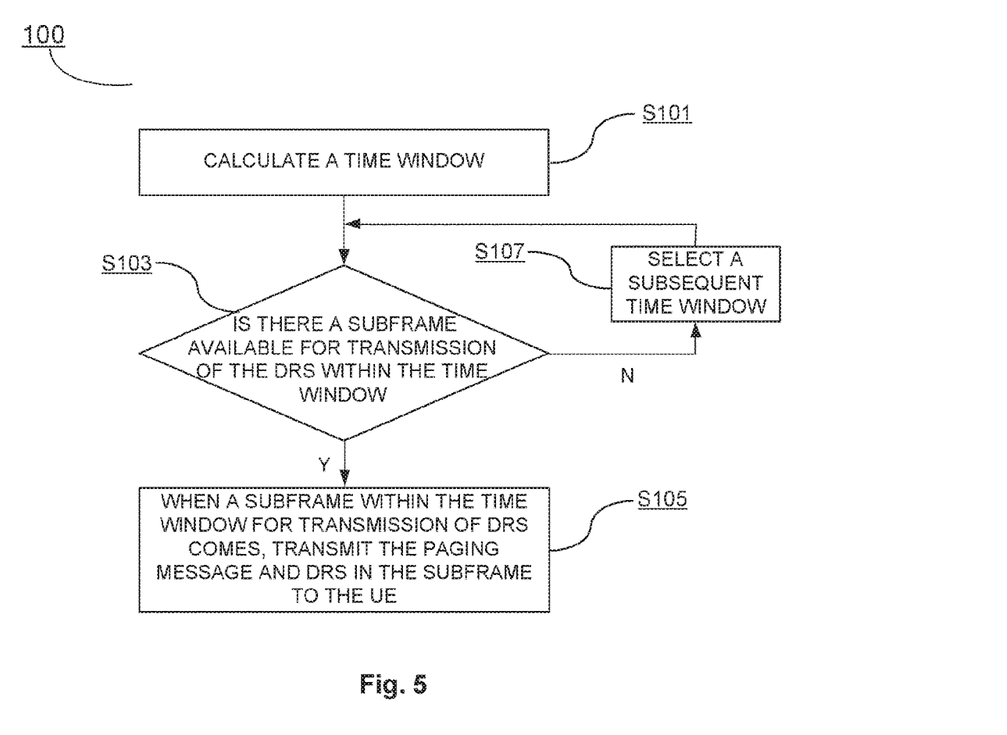
FIG. 5 illustratively shows a flowchart of a paging method according to an embodiment of the present disclosure.

As shown in FIG. 5, the method 100 may comprise steps S101 to S107.

When there is a paging message for a UE received by the access node, a time window for transmission of a discovery reference signal DRS (which is also referred to as a DTMC window, as previously described) is calculated by the access node in step S101, in which a paging message is allowed to be transmitted in the time window to the UE.

By aligning transmission of the paging message and transmission of the DRS in the same DMTC window, radio resource fragmentation due to the paging message transmission may be avoided.

The access node may calculate the DTMC window according to a paging occasion mapping scheme which will be described later. The access node then may buffer the paging message to wait for the DTMC window's coming.

In step S103, the access node determines whether there is a subframe available for transmission of the DRS within the DTMC window.

If it is determined that there is a subframe available for transmission of the DRS within the DTMC window, the access node transmits the paging message in the same subframe to the UE in step S105.

Hereinafter, the paging occasion mapping scheme used for calculation of the DMTC window in the present embodiment will be described in detail.

In the technical solutions of conventional LTE systems, the paging occasion is UE-specific which may occur in each subframe which is derived from mapping schemes as previously introduced. Differently, according to the present embodiment, the DMTC window for transmission of the paging message is calculated according to at least two parameters obtained from system information, and the subframe available for transmission of the paging message within the DTMC window is determined based on a carrier sensing mechanism such as LBT (which is the $1^{st}$ subframe by default, since it is generally desired to transmit the DRS and the paging message as soon as possible). That is, the paging message may only occur in the subframe with LBT success (i.e., no fixed subframe number) within the calculated DTMC window. Thus, the paging occasion will be firstly identified in terms of DMTC window index and then determined based on e.g. LBT, instead of radio frame and subframe number in conventional LTE systems as introduced previously. DMTC index timing could be obtained at UE side from reading system information along with the DRS transmission.

Different paging occasion determination methods (in terms of DMTC window index) are exemplified below.

The DMTC window may be calculated according to following implementations:

an identifier of the UE 'UE_ID' and a cell-specific paging cycle for the UE; or the UE_ID, the cell-specific paging cycle for the UE and a UE-specific paging cycle for the UE; or the UE_ID, the cell-specific paging cycle for the UE and a number of the time windows in one paging cycle for the UE, which will be described in detail below.

In a first implementation, paging occasion=function (UE_ID, cell-specific paging cycle).

According to this implementation, there is one cell-specific paging cycle which is broadcasted by the cell and applied for all camping UEs within this cell. The cell-specific paging cycle is defined to be an integer number of DMTC windows.

As the LTE-USA cell may only serve as Pico cell, it may not be necessary to develop a complex scheme to deal with heavy paging load occasions. For one UE, an index of the corresponding DMTC window for transmission of the paging message can be determined according to Formula (2):

$$I_{page} = \mathrm{mod}(ID_{UE}, T_{cell}) \quad (2)$$

Where $I_{page}$ is an index of the DMTC window for transmission of the paging message within a cell-specific paging message transmission cycle, $ID_{UE}$ is an identifier of the UE 'UE_ID', and $T_{cell}$ is a cell-specific paging message transmission cycle in number of DMTC windows.

In case of heavy traffic load, the access node can configure a shorter $T_{cell}$. The advantage of this method is that only a cell-specific paging message transmission is configured and complexity is low.

In a second implementation, paging occasion=function (UE_ID, cell-specific paging cycle, UE-specific paging cycle)

A LTE-USA access node may serve terminals with various traffics with different delay requirement. UE-specific paging cycle may be configured to fulfill a delay requirement for delay for a session setup. The effective paging cycle for one UE shall be a minimum of the cell-specific paging cycle and the UE-specific paging cycle. For one UE, an index of the corresponding DMTC window for transmission of the paging message can be determined according to Formulas (3) and (4):

$$T_{effective} = \min(T_{UE}, T_{cell}) \quad (3)$$

$$I_{page} = \mathrm{mod}(ID_{UE}, T_{effective}) \quad (4)$$

Where $T_{UE}$ is the UE-specific paging message transmission cycle in number of DMTC cycles.

The access node has flexibility to configure different effective paging cycle for different UE at cost of some complexity increase compared to the first implementation.

In a third implementation, paging occasion=function (UE_ID, cell-specific paging cycle, number of paging DMTCs in one paging cycle)

One index can be firstly derived based on Formula (5). Based on a predefined mapping relationship between the derived index and a DMTC set for paging message transmission with respect to the number of paging DMTC windows in one paging cycle, the access node and the UE can derive the index of DMTC windows for paging message transmission for this UE.

$$I_{DMTC} = \mod(ID_{UE}, T_{cell}) \qquad (5)$$

Where $I_{DMTC}$ is an index to the DMTC set for transmission of the paging message. The UE shall monitor the paging message over each DMTC window within the DMTC set and the access node can select any DMTC window from the DMTC set for transmission of the paging message for the UE.

The number of paging DMTC windows in one paging cycle can either be cell-specific or UE-specific.

On the other hand, if it is determined that there is no subframe available for transmission of the DRS within the DMTC window, the access node selects a subsequent time window for transmission of the DRS in which the paging message is allowed to be transmitted to the UE in step S107.

Since the carrier sensing mechanism such as LBT is applied in LTE-USA, the access node needs to scan a radio channel in order to see whether it is free prior to transmission. If the radio channel is unavailable during the time for transmission of the paging message, the paging message will not be transmitted, and the UE will not be able to receive the paging message.

In the technical solutions of conventional LTE systems, if the paging message is not sent because of the channel being unavailable, the access node has to select a subsequent paging cycle (i.e., DTX cycle) (in seconds, e.g., 2.56 seconds) for transmission of the paging message to the UE.

Differently, in the present embodiment of the present disclosure, it is proposed that the access node may select a subsequent DMTC window within the DRX cycle (i.e. prior to the next ordinary paging cycle), in which the paging message is allowed to be transmitted to the UE.

By selecting the subsequent DMTC window, due to unavailable channel in the current time window, for transmission of the DRS in which the paging message is allowed to be transmitted to the UE, the paging message may be transmitted after a time interval (in an order of $10^{th}$ of ms) which is much smaller than the DRX cycle (in seconds), which may reduce the delay for peer to peer session setup.

In another embodiment, step S107 may be performed in a case that a paging cycle (i.e., the DRX cycle) is larger than a predetermined threshold (e.g. >100 ms), where the predetermined threshold may be signaled to and known by the UE.

There may be different implementations of step S107. For example, in one implementation, since the paging message is aligned with the DRS transmission, if it is determined that there is no subframe available for transmission of DRS within the DMTC window, the access node may select the next DMTC window for transmission of the DRS in which the paging message is allowed to be transmitted to the UE. In another implementation, if it is determined that there is no subframe available for transmission of DRS within the DMTC window, the access node may select a subsequent (but not necessarily adjacent) DMTC window with a predetermined time later than the calculated DMTC window (e.g., 20 ms later than the calculated DMTC window) for transmission of the DRS in which the paging message is allowed to be transmitted to the UE. In yet another implementation, if it is determined that there is no subframe available for transmission of DRS within the DMTC window, the access node may select a subsequent DMTC window whose index may be determined based on UE_ID for transmission of the DRS in which the paging message is allowed to be transmitted to the UE.

As will be understood by the skilled in the art, the implementations of step S107 are not limited to these, and other implementations may also be possible.

Such a pattern of transmitting the paging message due to the channel being unavailable may be configured by the access node in LTE-USA, or another network node in the Radio Access Node (RAN), and signaled to the UE either via broadcast message (MIB/SIB) or via dedicated RRC signaling (for instance at initial attach/registration to the LTE-USA network).

Accordingly, a flowchart of a paging detection method at a UE according to an embodiment of the present disclosure will be described with reference to FIG. 6.

Figure 6:
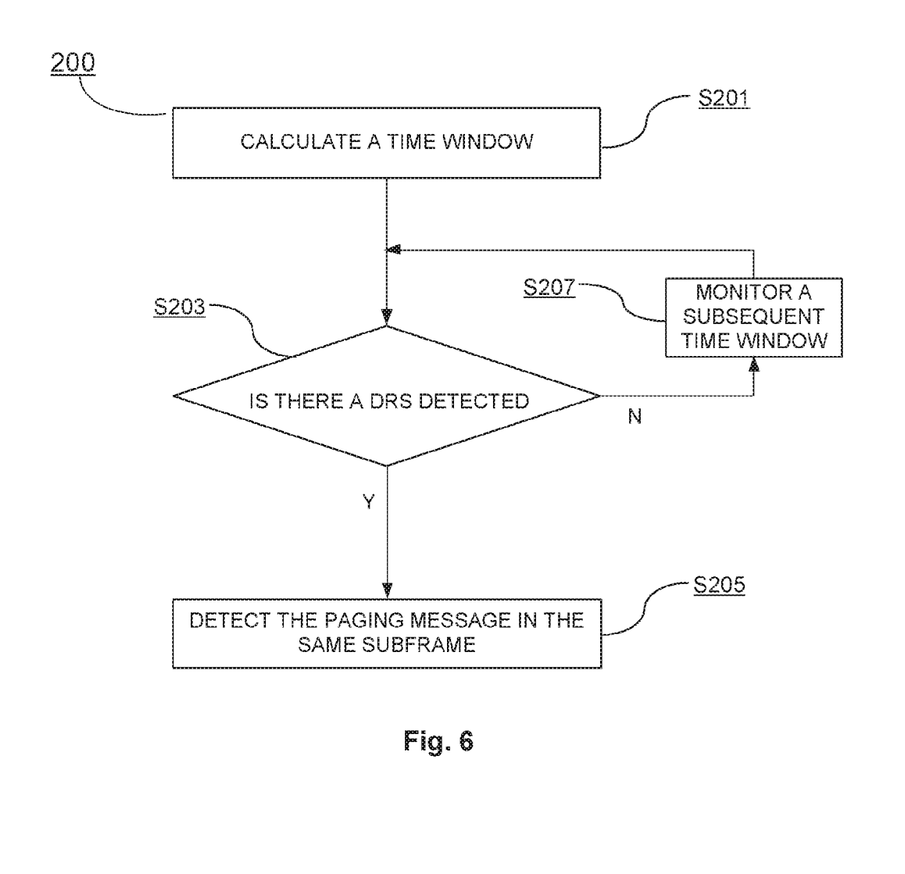
FIG. 6 illustratively shows a flowchart of a paging detection method according to an embodiment of the present disclosure.

As shown in FIG. 6, the method 200 may comprise steps S201 to S207.

Similar with the access node, the UE calculates the DMTC window for detecting a DRS, in which a paging message is to be monitored in step S201. The methods of calculating the DMTC window by the UE may refer to the way of calculating the DMTC window by the access node, and the description thereof is omitted for simplicity.

In step S203, the UE determines whether there is a DRS detected in a subframe within the DMTC window.

If it is determined that there is a DRS detected in a subframe within the DMTC window, the UE detects a paging message in the same subframe in step 205.

On the other hand, if it is determined that there is no DRS detected in any of subframes within the DMTC window, the UE monitors a subsequent DMTC window for detecting the DRS, in which a paging message is to be monitored as well in step S207.

Since the carrier sensing mechanism such as LBT is applied in LTE-USA, the access node needs to scan a radio channel in order to see whether it is free prior to transmission. If the radio channel is unavailable during the time for transmission of the paging message, the paging message will not be transmitted, and the UE will not be able to receive the paging message. Hence, in the present embodiment of the present disclosure, it is proposed that the UE may monitor a subsequent DMTC window within the DRX cycle (i.e. prior to the next ordinary paging opportunity), in which the paging message is to be monitored.

In another embodiment, step S207 may be performed in a case that a paging cycle (i.e., the DRX cycle) is larger than a predetermined threshold (e.g. >100 ms), where the predetermined threshold may be signaled and known by the UE.

There may be different implementations of step S207. For example, in one implementation, since the paging message is aligned with the DRS transmission, if it is determined that there is no DRS detected in any of subframes within the DMTC window, the UE may monitor the next DMTC window for detecting the DRS in which the paging message is to be monitored. In another implementation, if it is determined that there is no DRS detected in any of subframes within the DMTC window, the UE may monitor a subsequent (but not adjacent) DMTC window with a predetermined time later than the calculated time window (e.g., 20 ms later than the calculated DMTC window) for detecting the DRS in which the paging message is to be monitored. In yet another implementation, if it is determined that there is no DRS detected in any of subframes within the DMTC window, the UE may monitor a subsequent DMTC window whose index may be determined based on UE_ID for detecting the DRS in which the paging message is to be monitored.

As will be understood by the skilled in the art, the implementations of step S207 are not limited to these, and other implementations may also be possible.

Figure 7:
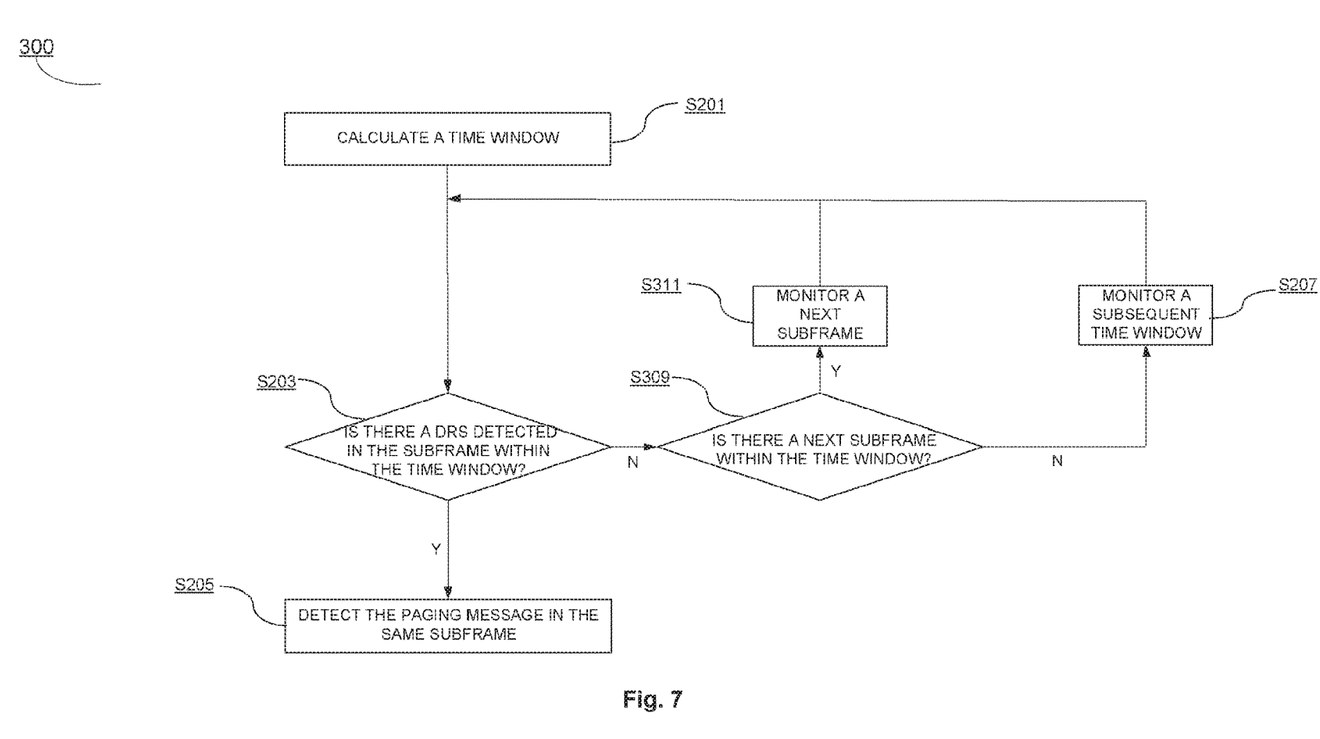
FIG. 7 illustratively shows a flowchart of a paging detection method according to another embodiment of the present disclosure.

FIG. 7 illustratively shows a flowchart of a paging detection method according to another embodiment of the present disclosure. As shown in FIG. 7, the paging detection method according to another embodiment further comprises steps S309 and S311, and the remaining components with the same reference numbers as those in FIG. 6 are completely identical with the corresponding components in FIG. 6, thus the description thereof will be omitted for simplicity.

As show in FIG. 7, the UE determines in step S203 whether there is a DRS detected in a subframe within the DMTC window. If it is determined that there is no DRS detected in the subframe, the access node further determines in step S309 whether there is a next subframe within the DMTC window.

If it is determined in step S309 that there is a next subframe within the DMTC window, i.e. the current subframe is not the last subframe within the DMTC window, the UE monitors the next subframe within the DMTC window for detecting the DRS in which the paging message is to be monitored in step S311.

If it is determined in step S309 that there is no next subframe within the DMTC window, i.e. the current subframe is the last subframe within the DMTC window, the method proceeds to step S207, in which the UE monitors a subsequent DMTC window for detecting the DRS, in which a paging message is to be monitored.

One benefit to send the paging message in the same Transmission Time Interval (TTI) as the DRS at the access node side and to detect the paging message in the same TTI as the DRS at the UE side consists in that the UE may first refine a channel estimation result based on the DRS and then use the refined channel estimation result for tentatively decoding the paging message: thereby, additional tentative decoding for the paging message due to channel availability uncertainties may be avoided. On the other hand, the UE may perform synchronization using the DRS when it wakes up from the DRX state, which may guarantee good performance for receiving paging message.

During the DMTC window for DRS detection, the UE shall buffer analog to digital (AD) converted samples for both the possible DRS detection and the possible paging message detection. When the UE detects the DRS, the UE shall perform channel estimation for the paging message decoding based on the trained channel (including time domain synchronization, frequency domain synchronization, Doppler) during the DRS detection.

The channel estimation results of DRS may be used to assist the channel estimation for paging message detection. When the paging message transmission occasion comes, the UE shall first determine if there is DRS. If the DRS is detected, the UE further monitors the possible paging message transmission with assist of channel estimation results for DRS detection. When the DMTC window includes multiples subframes, this procedure shall be repeated from the start of the DMTC window to the subframe for DRS TX or the end of the DMTC window, as previously described in connection with FIG. 7.

Similar problems discussed above do not only exist in LTE-USA, but exist in other RAT operated over unlicensed spectrum in standalone mode as well. For instance, unlicensed spectrum operation for New Radio Access Technology (New RAT), and the upcoming the fifth generation (5G). Therefore, the paging mechanism disclosed can also solve the similar problem in unlicensed spectrum operation in New RAT and 5G. Thus the solutions mentioned above can be also applied to the UE and access node in New RAT and 5G when they are operated over unlicensed spectrum in standalone mode.

Figure 8:
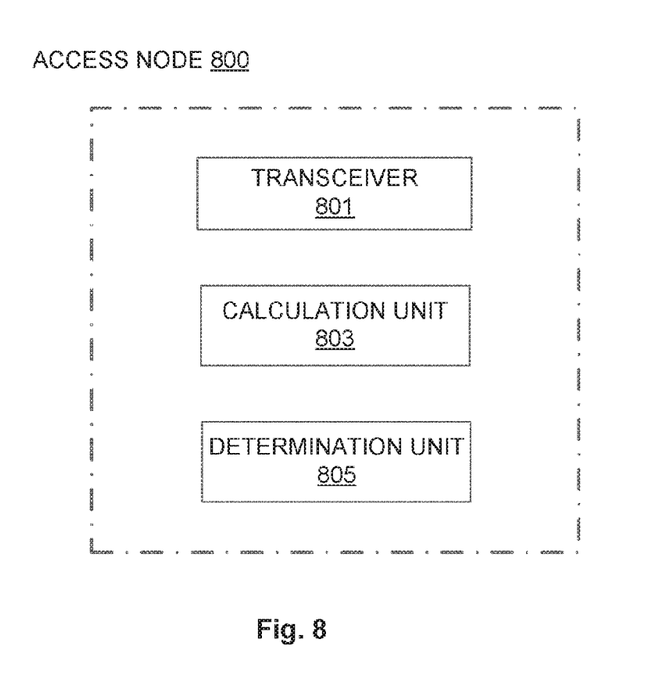
FIG. 8 illustratively shows a schematic structure diagram of an access node according to an embodiment of the present disclosure.

A structure of an access node will be described with reference to FIG. 8. FIG. 8 illustratively shows a schematic structure diagram of an access node according to an embodiment of the present disclosure. The access node 800 in FIG. 8 may perform the method 100 described previously with reference to FIG. 5.

As shown in FIG. 8, the access node 800 comprises a transceiver 801, a calculation unit 803 and a determination unit 805. As will be understood by the skilled in the art, common components in the access node 800 are omitted in FIG. 8 for not obscuring the idea of the present disclosure.

In particular, the calculation unit 803 is configured to calculate, in step S101, a time window for transmission of a DRS (i.e., a DMTC window), in which a paging message is allowed to be transmitted to a UE.

The determination unit 805 is configured to determine, in step S103, whether there is a subframe available for transmission of the DRS within the DMTC window.

If the determination unit 805 determines, in step S103, that there is a subframe available for transmission of the DRS within the DMTC window, the transceiver 801 is configured to transmit the paging message in the same subframe to the UE.

In an embodiment, the access node 800 may comprise a selection unit (not shown), which is configured to, if the determination unit 805 determines that there is no subframe available for transmission of the DRS within the DMTC window, select, in step S107, a subsequent DMTC window for transmission of the DRS, in which the paging message is allowed to be transmitted to the UE.

In another embodiment, the selection unit may be configured to select the subsequent DMTC window if the determination unit 805 determines that a paging cycle (i.e., the DRX cycle) is larger than a predetermined threshold (e.g. >100 ms), where the predetermined threshold may be signaled and known by the UE.

Figure 9:
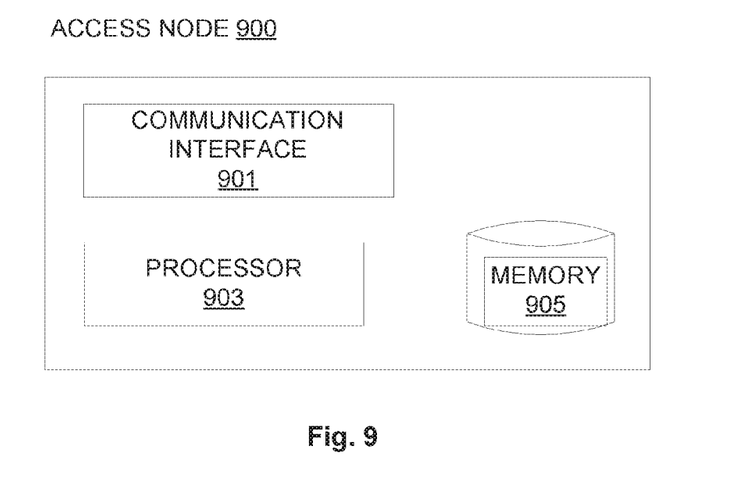
FIG. 9 illustratively shows a schematic structure diagram of an access node according to another embodiment of the present disclosure.

Hereinafter, another structure of an access node will be described with reference to FIG. 9. FIG. 9 illustratively shows a schematic structure diagram of an access node according to another embodiment of the present disclosure. The access node 900 in FIG. 9 may perform the method 100 described previously with reference to FIG. 5.

As shown in FIG. 9, the access node 900 comprises at least one controller or processor 903 comprising e.g., any suitable Central Processing Unit, CPU, microcontroller, Digital Signal Processor, DSP, etc., capable of executing computer program code. The computer program code may be stored in a memory 905. The memory 905 may be any combination of a RAM (Read And Write Memory) and a ROM (Read Only Memory). The memory may also comprise persistent storage, which, for example, can be any single one or combination of magnetic memory, optical memory, or solid state memory or even remotely mounted memory. The example access node 900 further comprises a communication interface 901 arranged for wireless communication with other devices or nodes, such as a UE served by the access node.

The computer program code, when loaded from the memory 905 and run in the processor 903, causes access node 900 to perform the methods according to the disclosure, such as the method 100 as previously described. In an embodiment, the computer program code, when executed, cause access node 900 to calculate, in step S101, a time window for transmission of a DRS, in which a paging message is allowed to be transmitted to a UE; to determine, in step S103, whether there is a subframe available for transmission of the DRS within the time window; and if it is determined that there is a subframe available for transmission of the DRS within the time window, to transmit, in step S105, the paging message in the same subframe to the UE; if it is determined that there is no subframe available for transmission of the DRS within the time window, to select, in step S107, a subsequent time window for transmission of the DRS, in which the paging message is allowed to be transmitted to the UE.

Figure 10:
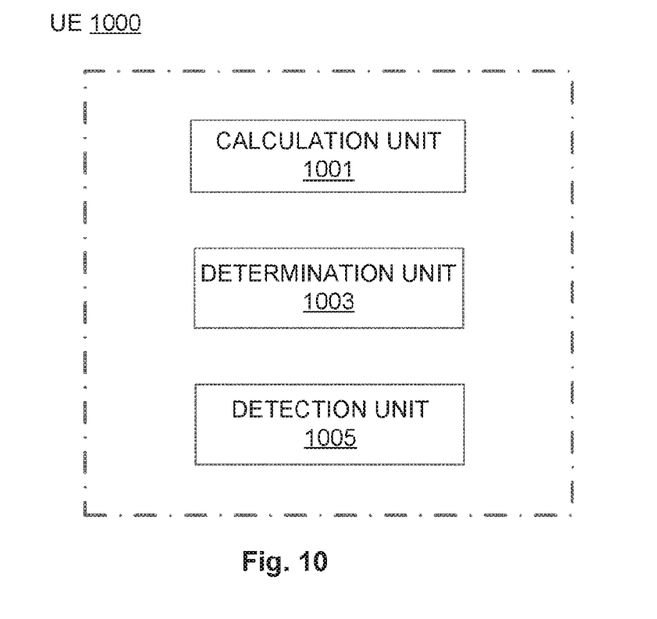
FIG. 10 illustratively shows a schematic structure diagram of a UE according to an embodiment of the present disclosure.

Hereinafter, a structure of a UE will be described with reference to FIG. 10. FIG. 10 illustratively shows a schematic structure diagram of a UE according to an embodiment of the present disclosure. The UE 1000 in FIG. 10 may perform the methods 200 and 300 described previously with reference to FIGS. 6 and 7 respectively.

As shown in FIG. 10, the UE 1000 comprises a calculation unit 1001, a determination unit 1003, and a detection unit 1005. As will be understood by the skilled in the art, common components in the UE 1000 are omitted in FIG. 10 for not obscuring the idea of the present disclosure.

In particular, the calculation unit 1001 is configured to calculate, in step S201, a time window for detecting a DRS (i.e. a DMTC window), in which a paging message is to be monitored.

The determination unit 1003 is configured to determine, in step S203, whether there is a DRS detected in a subframe within the time window.

If the determination unit 1003 determines, in step S203, that there is a DRS detected in a subframe within the time window, the detection unit 1005 detects a paging message in the same subframe in step S205.

In an embodiment, the UE 1000 may further comprise a monitoring unit (not shown), which is configured to, if the determination unit 1003 determines that there is no DRS detected in any of subframes within the time window, monitor, in step S207, a subsequent time window for detecting the DRS, in which a paging message is to be monitored.

In another embodiment, the monitoring unit may be configured to monitor, in step S207, the subsequent DMTC window if the determination unit 1003 determines that a paging cycle (i.e., the DRX cycle) is larger than a predetermined threshold (e.g. >100 ms), where the predetermined threshold may be signaled and known by the UE.

In another embodiment, the monitoring unit is further configured to monitor, in step S311, a next subframe within the time window for monitoring the DRS, in which a paging message is to be monitored unless the subframe is the last subframe within the time window, if the determination unit 1003 determines that there is no DRS detected in the subframe.

Figure 11:
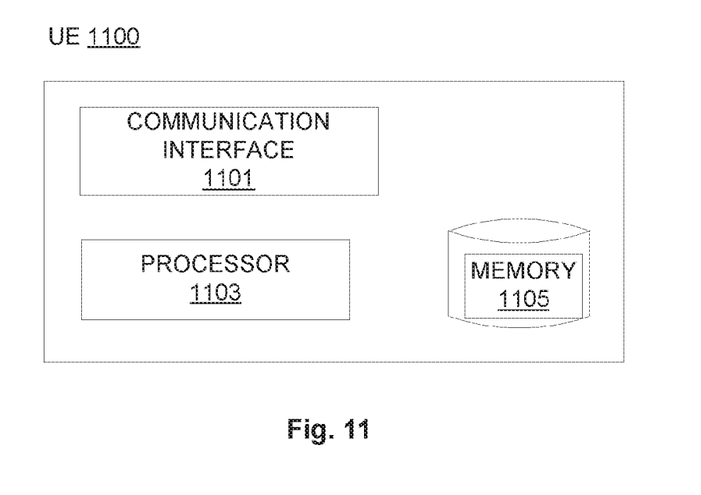
FIG. 11 illustratively shows a schematic structure diagram of a UE according to another embodiment of the present disclosure.

Hereinafter, another structure of a UE will be described with reference to FIG. 11. FIG. 11 illustratively shows a schematic structure diagram of a UE according to another embodiment of the present disclosure. The UE 1100 in FIG. 11 may perform the methods 200 and 300 described previously with reference to FIGS. 6 and 7.

As shown in FIG. 11, the UE 1100 comprises at least one controller or processor 1103 comprising e.g., any suitable Central Processing Unit, CPU, microcontroller, Digital Signal Processor, DSP, etc., capable of executing computer program code. The computer program code may be stored in a memory 905. The memory 1105 may be any combination of a RAM (Read And Write Memory) and a ROM (Read Only Memory). The memory may also comprise persistent storage, which, for example, can be any single one or combination of magnetic memory, optical memory, or solid state memory or even remotely mounted memory. The example UE 1100 further comprises a communication interface 1101 arranged for wireless communication with other devices or nodes, such as the access node serving the UE.

The computer program code, when loaded from the memory 1105 and run in the processor 1103, causes the UE 1100 to perform the methods according to the disclosure, such as the methods 200 and 300 as previously described. In an embodiment, the computer program code, when executed, cause the UE 1100 to calculate, in step S201, a time window for detecting a discovery reference signal DRS, in which a paging message is to be monitored; to determine, in step S203, whether there is a DRS detected in a subframe within the time window; and if it is determined that there is a DRS detected in a subframe within the time window, to detect, in step S205, a paging message in the same subframe; if it is determined that there is no DRS detected in the subframe, to monitor, in step S311, a next subframe within the time window for detecting the DRS, in which a paging message is to be monitored, unless the subframe is the last subframe within the time window; and if it is determined that there is no DRS detected in any of subframes within the time window, to monitor, in step S207, a subsequent time window for detecting the DRS, in which a paging message is to be monitored.

As previously described, similar problems discussed above do not only exist in LTE-USA, but exist in other RAT operated over unlicensed spectrum in standalone mode as well. For instance, unlicensed spectrum operation for New RAT, and the upcoming 5G. Therefore, the access node and the UE for the paging mechanism disclosed mentioned above can also solve the similar problem in unlicensed spectrum operation in New RAT and 5G when they are operated over unlicensed spectrum in standalone mode.

According to foregoing embodiments of the disclosure, the disclosure has at least the following advantages:

By aligning transmission of the paging message and transmission of the DRS in the same time window, radio resource fragmentation due to the paging message transmission as well as additional tentative decoding for the paging message due to channel availability uncertainties may be avoided; and the UE may perform synchronization using the DRS when it wakes up from the DRX state, which may guarantee good performance for receiving paging message.

By selecting the subsequent time window, due to unavailable channel in the current time window, for transmission of the DRS in which the paging message is allowed to be transmitted to the UE, the paging message may be transmitted after a time interval (in an order of $10^{th}$ of ms) which is much smaller than the DRX cycle (in seconds), which may reduce the delay for peer to peer session setup.

The foregoing description of implementations provides illustration and description, but is not intended to be exhaustive or to limit the disclosure to the precise form disclosed. Modifications and variations are possible in light of the above teachings, or may be acquired from practice of the disclosure.

Aspects of the disclosure may also be embodied as methods and/or computer program products. Accordingly, the disclosure may be embodied in hardware and/or in hardware/software (including firmware, resident software, microcode, etc.). Furthermore, the embodiments may take the form of a computer program product on a computer-usable or computer-readable storage medium having computer-usable or computer-readable program code embodied in the medium for use by or in connection with an instruction execution system. Such instruction execution system may be implemented in a standalone or distributed manner. The actual software code or specialized control hardware used to implement embodiments described herein is not limiting of the disclosure. Thus, the operation and behavior of the aspects were described without reference to the specific software code, it being understood that those skilled in the art will be able to design software and control hardware to implement the aspects based on the description herein.

Furthermore, certain portions of the disclosure may be implemented as "logic" that performs one or more functions. This logic may include hardware, such as an application specific integrated circuit or field programmable gate array or a combination of hardware and software.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the disclosure should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

What is claimed is:

1. A paging detection method at a user equipment (UE), comprising:
   calculating a time window for detecting a discovery reference signal (DRS), in which a paging message is to be monitored;
   determining whether there is a DRS detected in a subframe within the time window;
   responsive to determining that there is a DRS detected in a subframe within the time window, detecting a paging message in the same subframe; and
   responsive to determining that there is no DRS detected in any subframes within the time window, and if a paging cycle is larger than a predetermined threshold, monitoring a subsequent time window for detecting the DRS, in which a paging message is to be monitored.

2. The paging detection method of claim 1, wherein the time window is calculated according to one of:
   an identifier of the UE (UE_ID) and a cell-specific paging cycle for the UE;
   the UE_ID, the cell-specific paging cycle for the UE and a UE-specific paging cycle for the UE; and
   the UE_ID, the cell-specific paging cycle for the UE and a number of time windows in one paging cycle for the UE.

3. The paging detection method of claim 1, wherein the paging message is detected in the same subframe with the assistance of a channel estimation result for the DRS.

4. The paging detection method of claim 1, wherein one of the following is monitored as the subsequent time window:
   a time window next to the calculated time window;
   a time window with a predetermined time later than the calculated time window; and
   a time window determined based on an identifier of the UE (UE_ID).

5. The paging detection method of claim 1, further comprising:
   responsive to determining that there is no DRS detected in the subframe, monitoring a next subframe within the time window for detecting the DRS, in which a paging message is to be monitored, unless the subframe is the last subframe within the time window.

6. An access node for paging, comprising:
   a transceiver, configured to transmit messages;
   a memory, configured to store data and instructions therein; and
   a processor, configured to cause the access node to perform under the instructions stored in the memory to:
     calculate a time window for transmission of a discovery reference signal (DRS), in which a paging message is allowed to be transmitted to a user equipment (UE);
     determine whether there is a subframe available for transmission of the DRS within the time window;
     responsive to determining that there is a subframe available for transmission of the DRS within the time window, transmit the paging message in the same subframe to the UE; and
     responsive to determining that there is no subframe available for transmission of the DRS within the time window, and if a paging cycle is larger than a predetermined threshold, select a subsequent time window for transmission of the DRS, in which the paging message is allowed to be transmitted to the UE.

7. The access node according to claim 6, wherein the time window is calculated according to one of:
   an identifier of the UE (UE_ID) and a cell-specific paging cycle for the UE;
   the UE_ID, the cell-specific paging cycle for the UE and a UE-specific paging cycle for the UE; and
   the UE_ID, the cell-specific paging cycle for the UE and a number of time windows in one paging cycle for the UE.

8. The access node according to claim 6, wherein the subframe available for transmission within the time window is determined based on a carrier sensing mechanism.

9. The access node according to claim 6, wherein one of the following is selected as the subsequent time window:
   a time window next to the calculated time window;
   a time window with a predetermined time later than the calculated time window; and
   a time window determined based on an identifier of the UE (UE_ID).

10. A user equipment (UE), comprising:
    a memory, configured to store data and instructions therein; and
    a processor, configured to cause the UE to perform the instructions stored in the memory to:
      calculate a time window for detecting a discovery reference signal (DRS), in which a paging message is to be monitored;
      determine whether there is a DRS detected in a subframe within the time window;

responsive to determining that there is a DRS detected in a subframe within the time window, detect a paging message in the same subframe;

responsive to determining that there is no DRS detected in any subframes within the time window, and if a paging cycle is larger than a predetermined threshold, monitor a subsequent time window for detecting the DRS, in which a paging message is to be monitored.

11. The UE according to claim 10, wherein the time window is calculated according to one of:

an identifier of the UE (UE_ID) and a cell-specific paging cycle for the UE;

the UE_ID, the cell-specific paging cycle for the UE and a UE-specific paging cycle for the UE; and the UE_ID, the cell-specific paging cycle for the UE and a number of the time windows in one paging cycle for the UE.

12. The UE according to claim 10, wherein the paging message is detected in the same subframe with the assistance of a channel estimation result for the DRS.

13. The UE according to claim 10, wherein one of the following is monitored as the subsequent time window:

a time window next to the calculated time window;

a time window with a predetermined time later than the calculated time window; and a time window determined based on an identifier of the UE (UE_ID).

14. The UE according to claim 10, wherein one of the following is monitored as the subsequent time window:

a time window next to the calculated time window;

a time window with a predetermined time later than the calculated time window; and a time window determined based on an identifier of the UE (UE_ID).

15. The UE according to claim 10, wherein the processor is further configured to cause the UE to:

responsive to determining that there is no DRS detected in the subframe, monitor a next subframe within the time window for detecting the DRS, in which a paging message is to be monitored, unless the subframe is the last subframe within the time window.

* * * * *